United States Patent [19]
Arimilli et al.

[11] Patent Number: 5,935,234
[45] Date of Patent: Aug. 10, 1999

[54] METHOD AND SYSTEM FOR CONTROLLING ACCESS TO A SHARED RESOURCE IN A DATA PROCESSING SYSTEM UTILIZING PSEUDO-RANDOM PRIORITIES

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/839,436

[22] Filed: Apr. 14, 1997

[51] Int. Cl.[6] .................................................. G06F 13/14
[52] U.S. Cl. ..................... 710/244; 710/241; 710/113; 710/116; 710/40; 711/151
[58] Field of Search ................................. 395/287–305, 395/856–865, 733–742, 726–732; 711/150–151

[56] References Cited

U.S. PATENT DOCUMENTS

| | | | |
|---|---|---|---|
| 4,470,112 | 9/1984 | Dimmick | 395/296 |
| 4,752,872 | 6/1988 | Ballatore et al. | 395/298 |
| 5,247,677 | 9/1993 | Welland et al. | 395/673 |
| 5,265,215 | 11/1993 | Fukuda et al. | 395/303 |
| 5,265,223 | 11/1993 | Brockmann et al. | 395/303 |
| 5,379,434 | 1/1995 | DiBrino | 395/737 |
| 5,515,516 | 5/1996 | Fisch et al. | 395/294 |
| 5,586,331 | 12/1996 | Levenstein | 395/726 |
| 5,706,446 | 1/1998 | Kalish et al. | 395/293 |
| 5,717,872 | 2/1998 | Whittaker | 395/285 |
| 5,754,800 | 5/1998 | Lentz et al. | 395/296 |

*Primary Examiner*—Glenn A. Auve
*Assistant Examiner*—Sumati Lefkowitz
*Attorney, Agent, or Firm*—Richard A. Henkler; Brian F. Russell; Andrew J. Dillon

[57] ABSTRACT

A method and system for controlling access to a shared resource in a data processing system are described. According to the method, a number of requests for access to the resource are generated by a number of requesters that share the resource. Each of the requesters is assigned a current priority, at least the highest current priority being determined substantially randomly with respect to previous priorities of the requestors. In response to the current priorities of the requestors, a request for access to the resource is granted. In one embodiment, a requester corresponding to a granted request is signaled that its request has been granted, and a requester corresponding to a rejected request is signaled that its request was not granted.

21 Claims, 5 Drawing Sheets

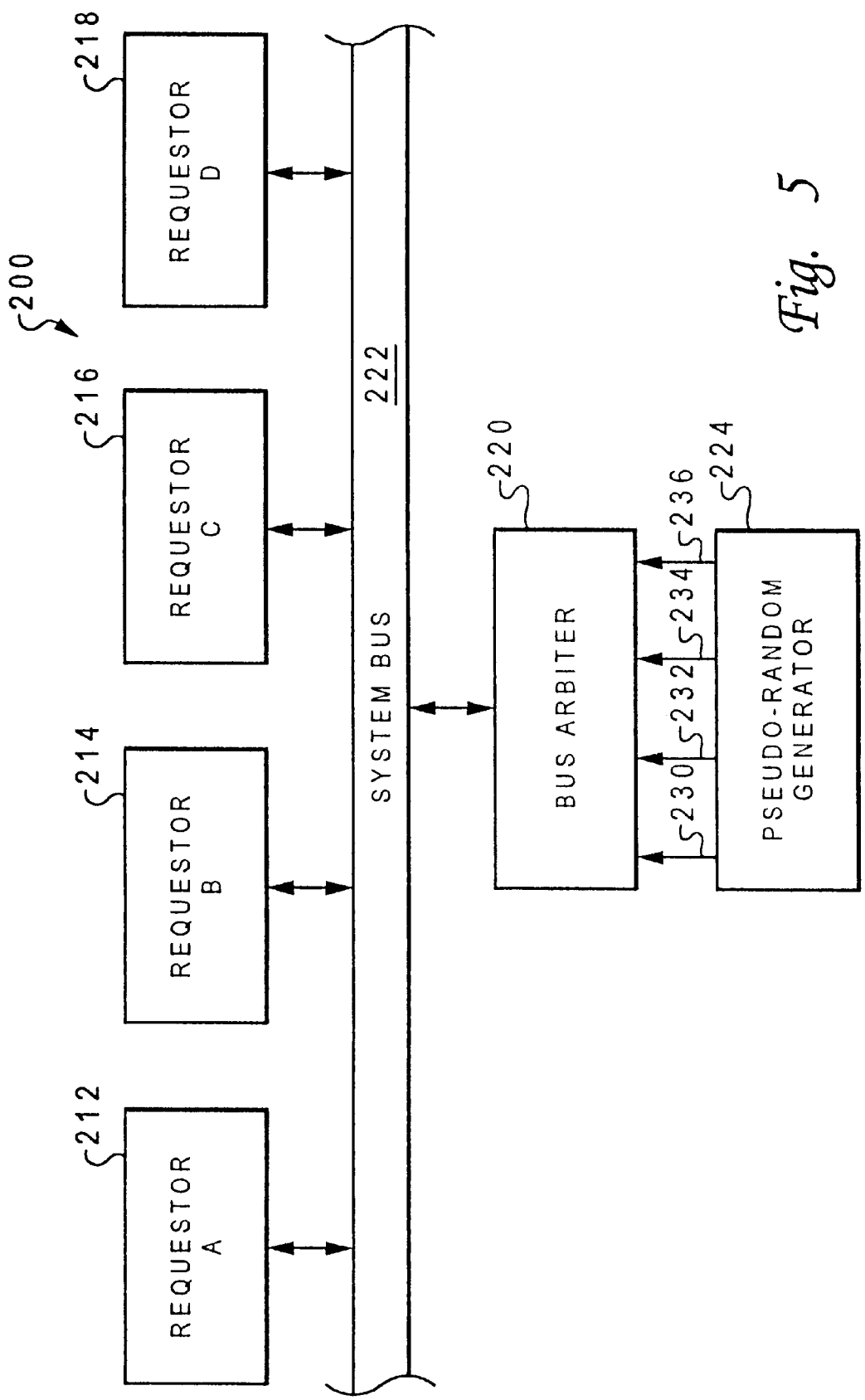

METHOD AND SYSTEM FOR CONTROLLING ACCESS TO A SHARED RESOURCE IN A DATA PROCESSING SYSTEM UTILIZING PSEUDO-RANDOM PRIORITIES

BACKGROUND OF THE INVENTION

1. Technical Field

The present invention relates in general to a method and system for data processing and in particular to a method and system for controlling access to a shared resource in a data processing system. Still more particularly, the present invention relates to a method and system for controlling access to a shared resource by a plurality of requesters in a data processing system, wherein at least a highest priority is assigned to one of the plurality of requesters substantially randomly with respect to previous priorities of the plurality of requesters.

2. Description of the Related Art

In data processing systems, it is common for a single resource to be shared by multiple devices that request service from or access to the resource. In these instances, some method of controlling access to the resource must be implemented to ensure that the devices obtain access to the shared resource in an manner that promotes efficient operation of the data processing system.

In conventional data processing systems, regulating access to a shared resource is often accomplished by assigning a fixed priority to each of the devices that may request service from or access to the shared resource. Such fixed priority systems, while providing a simple and efficient method of determining which access requests to grant, often fail to allocate adequate access to lower priority devices and operations, particularly when high priority devices generate frequent access requests. In order to address this problem, some conventional data processing systems implement a "round robin" resource allocation scheme in which access to the shared resource is provided to each of the multiple devices sequentially and cyclically. However, the implementation of a round robin resource allocation mechanism has its own concomitant problems. First, high priority devices and operations can be delayed, producing latency in critical timing paths and diminishing overall system performance. Second, and more subtlety, empirical data indicates that deterministic methods of allocating resource access, such as round robin, can lead to "live locks" or situations in which request timings permit only a few processes or devices to gain access to a shared resource, while effectively preventing access to the shared resource by other processes or devices.

As should thus be apparent, it would be desirable to provide an improved method and system for controlling access to a shared resource within a data processing system. In particular, it would be desirable to provide a method and system for controlling access to a shared resource that permit both high priority and low priority devices adequate access to a shared resource. In addition, it would be desirable to minimize the request to grant latency. Furthermore, in order to minimize live locks, it would be desirable for the method and system for controlling access to the shared resource to operate in a substantially non-deterministic manner.

SUMMARY OF THE INVENTION

It is therefore one object of the present invention to provide an improved method and system for data processing.

It is another object of the present invention to provide an improved method and system for controlling access to a shared resource in a data processing system.

It is yet another object of the present invention to provide a method and system for controlling access to a shared resource by a plurality of requesters in a data processing system, wherein at least a highest priority is assigned to one of the plurality of requesters substantially randomly with respect to previous priorities of the plurality of requesters.

The foregoing objects are achieved as is now described. A method and system for controlling access to a shared resource in a data processing system are provided. According to the method, a number of requests for access to the resource are generated by a number of requesters that share the resource. Each of the requesters is assigned a current priority, at least the highest current priority being determined substantially randomly with respect to previous priorities of the requesters. In response to the current priorities of the requesters, a request for access to the resource is granted. In one embodiment, a requester corresponding to a granted request is signaled that its request has been granted, and a requester corresponding to a rejected request is signaled that its request was not granted.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts a second illustrative embodiment of data processing system in accordance with the present invention in which the requestors are bus masters, the resource controller is a bus arbiter, and the shared resource is a shared system bus; and FIG. 6 illustrates a more detailed block diagram of the bus arbiter shown in FIG. 5.

DETAILED DESCRIPTION OF ILLUSTRATIVE EMBODIMENTS

Figure 1:
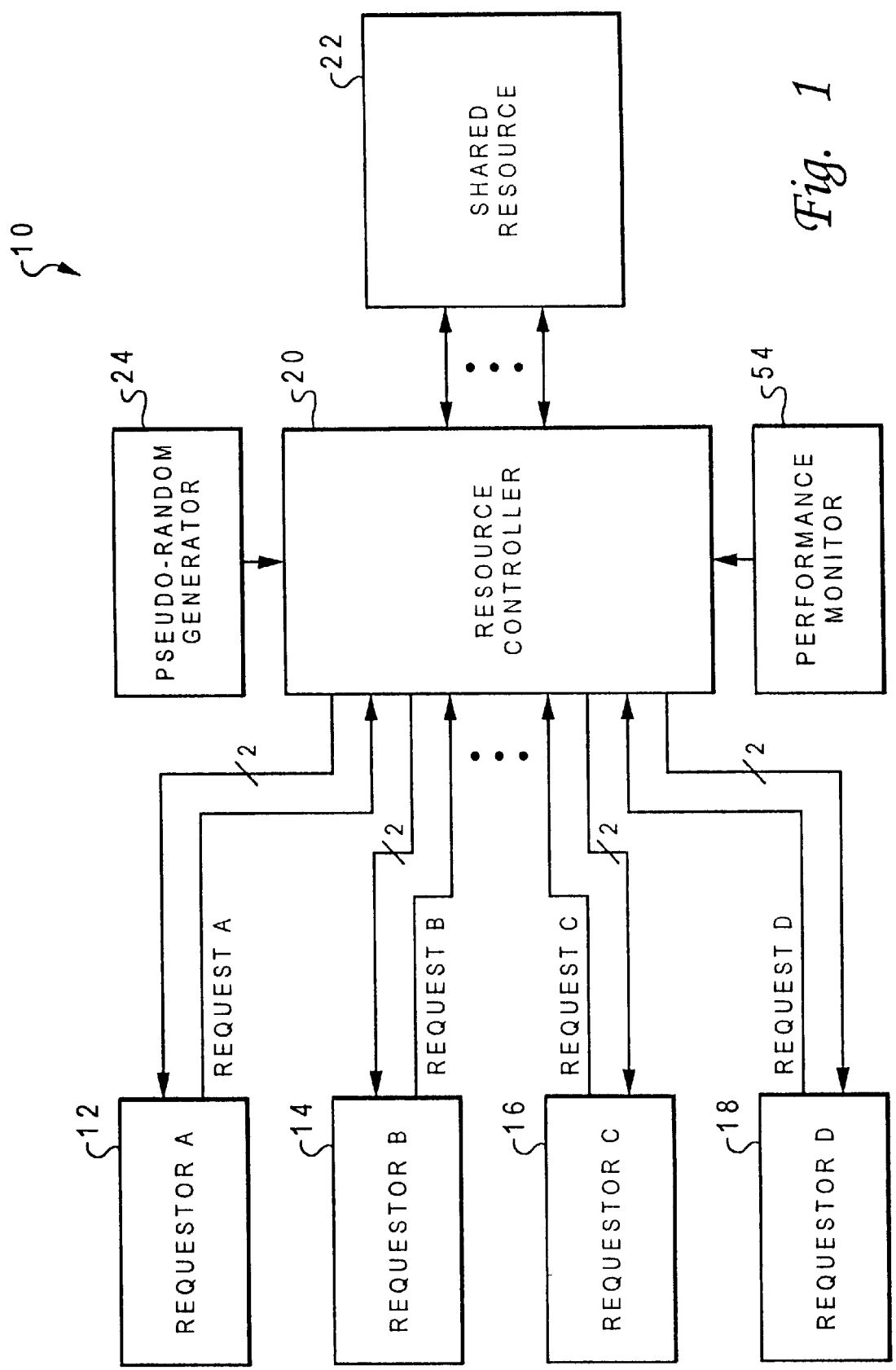
FIG. 1 depicts a first illustrative embodiment of a data processing system or portion of a data processing system with which the present invention may advantageously be utilized.

With reference now to the figures and in particular with reference to FIG. 1, there is depicted a data processing system in accordance with a first illustrative embodiment of the present invention. As illustrated, data processing system 10, which may comprise, for example, a computer system, a processor, or a memory subsystem, includes requesters 12–18 and optional additional requesters indicated by ellipsis notation. Each of requesters 12–18 is coupled to resource controller 20 by a request output signal and by acknowledge and grant/retry input signals. Resource controller 20 controls access by requesters 12–18 to shared resource 22, which can comprise any resource of data processing system 10, including a shared system bus, a L2 cache directory, or a processor. Data processing system 10 further includes performance monitor 54, which monitors and counts selected events within data processing system 10, including requests generated by requesters 12–18.

As illustrated in FIG. 1, the number of requests for access to (or service from) shared resource 22 that can be concurrently granted is less than the number of possible requests that may be generated by requesters 12–18. Accordingly, when resource controller 20 receives more requests for access to shared resource 22 than can be concurrently granted, resource controller 20 grants the requests of only selected ones of requesters 12–18 according to a priority order. In contrast to prior art data processing systems that allocate access to a shared resource in a deterministic manner, for example, according to fixed or round robin priority order, resource controller 20 utilizes an input from pseudo-random generator 24 to assign at least a highest priority to one of requesters 12–18 in a substantially non-deterministic manner.

Figure 2:
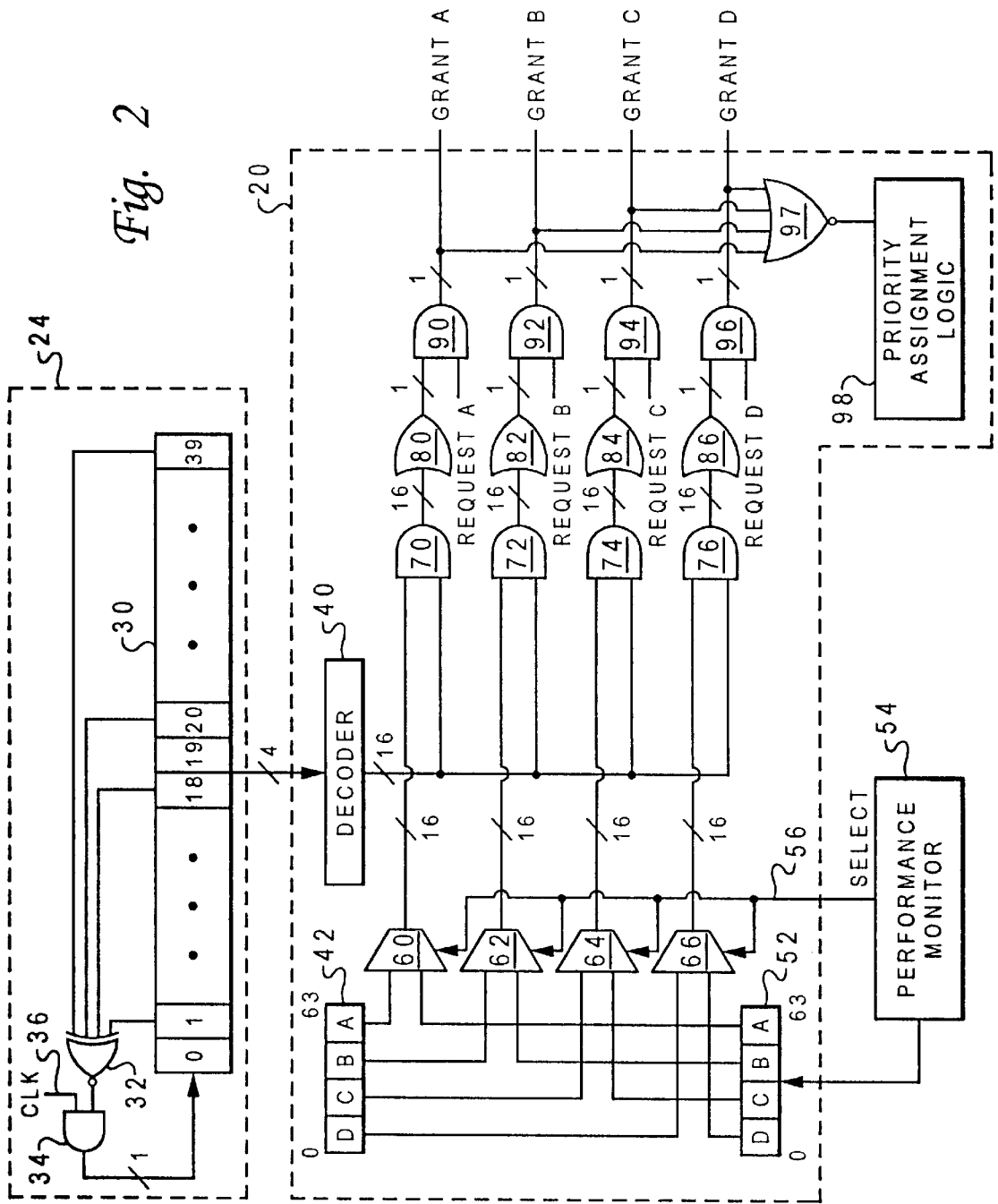
FIG. 2 illustrates a more detailed block diagram representation of the pseudo-random generator and resource controller illustrated in FIG. 1.

Referring now to FIG. 2, there is illustrated a more detailed block diagram representation of pseudo-random generator 24 and resource controller 20 within data processing system 10. Pseudo-random generator 24 comprises a 40-bit shift register 30 that is utilized to generate a 40-bit pseudo-random bit pattern during each clock cycle of data processing system 10. As depicted, bits 1, 18, 20, and 39 of shift register 30 serve as inputs of XNOR gate 32, which produces a 1-bit output that is connected to one input of AND gate 34. AND gate 34 has a second input coupled to clock signal 36, which supplies the clock pulses utilized to synchronize the operation of the components of data processing system 10, and an output connected to bit 0 of shift register 30. During power-on reset (POR), shift register 30 is initialized to all zeroes. Thereafter, XNOR gate 32 performs an exclusive-NOR operation on the values of bits 1, 18, 20, and 39. The resulting 1-bit output of XNOR gate 32 is shifted into bit 0 of shift register 30 when clock signal 36 goes high, and the values of bits 0–38 are shifted to the right (bit 39 is discarded), thereby generating a different bit pattern each cycle. While FIG. 2 depicts an embodiment of pseudo-random generator 24 that utilizes of specific bits of shift register 30 in order to generate a pseudo-random bit pattern having a good distribution of values, it should be understood that other combinations and numbers of bits may alternatively be employed. Furthermore, in order to make the bit patterns produced by shift register 30 truly non-deterministic over the operating life of data processing system 10, a larger shift register containing, for example, 80 bits could be utilized. Alternatively, a non-deterministic bit pattern could be obtained by sampling shift register 30 asynchronously with respect to clock signal 36.

During each clock cycle, the values of predetermined bits within shift register 30 are sampled by resource controller 20, which utilizes the state indicated by the predetermined bits to assign a highest priority to one of requesters 12–18. It is important to note that the number of bit values supplied to resource controller 20 is implementation-specific and depends upon the desired priority weight granularity. In the exemplary embodiment depicted in FIG. 2, the values of four predetermined bits, for example, bits 3, 7, 27, and 34, are utilized in order to provide an indication of one of sixteen possible states to resource controller 20 during each clock cycle. The state indicated by the 4-bit input is decoded by decoder 40 to produce a 16-bit value that indicates the decoded state by the bit position of a single bit set to 1.

Resource controller 20 further includes a software-accessible control register 42, which includes four 16-bit fields that each correspond to one of requestors 12–18. Control register 42 is written by software executing within data processing system 10 to assign each of the 16 possible states to one of requesters 12–18 by setting corresponding bits within each of the bit fields of control register 42. In order to avoid resource contention, a given bit position can be set to 1 in only a single field of control register 42.

Each of requesters 12–18 can be assigned equal priority weight by setting an equal number of bits within each of fields A–D of control register 42. Alternatively, each of requesters 12–18 can selectively be given greater or lesser priority weight by setting a greater or fewer number of bits in the corresponding field of control register 42. Thus, to give requester A 12 relatively greater priority weight, a large number of states can be allocated to requestor A 12 by setting a number of bits within field A of control register 42. It should be understood that although a particular one of requesters 12–18 may be accorded a greater priority weight by assigning that requester a large number of states, any of requesters 12–18 can be assigned the highest priority in any given cycle based upon the pseudo-random bit pattern generated by pseudo-random generator 24. Thus, being allocated a large number of states does not guarantee that a requester will be assigned the highest priority in any given cycle, but only the improves the probability that the requester will be assigned the highest priority.

Resource controller 20 also includes a control register 52 having the same arrangement and function as control register 42. In contrast to control register 42, which is programmable by software, control register 52 can be written by performance monitor 54 in response to events occurring within data processing system 10. Performance monitor 54 monitors and counts predefined events within data processing system 10 such as queue entries, clock cycles, misses in cache, instructions dispatched to a particular execution unit, and mispredicted branches. Based upon such monitoring, performance monitor 54 can dynamically update control register 52 in order to assign a greater or lesser priority weight to each of requesters 12–18.

Figure 3:
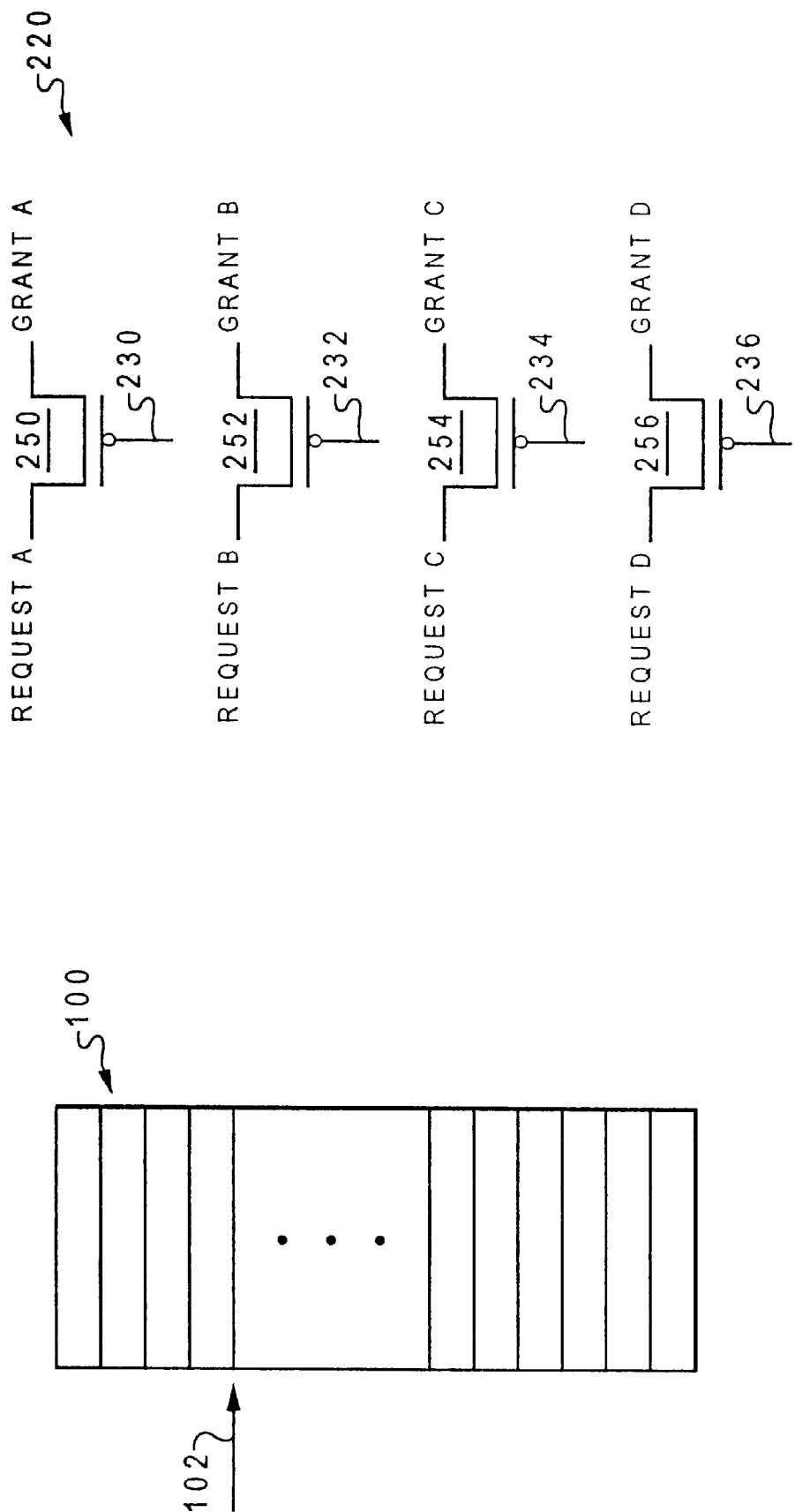
FIG. 3 depicts a request queue, which in an illustrative embodiment of the data processing system illustrated in FIG. 1, comprises a requester.

Referring now to FIG. 3, there is depicted a queue 100, which in an exemplary embodiment of data processing system 10 comprises one of requesters 12–18. Queue 100 may comprise a castout queue within a L2 cache or a queue for storing directory writes, for example. As illustrated, queue 100 has an associated high water mark 102 that specifies a threshold, which if exceeded, causes performance monitor 54 to raise the priority weight of queue 100. By monitoring selected events within data processing system 10, such as the number of requests by a particular requester that remain outstanding, and by adjusting priority weights of requesters in response to the monitored events, performance monitor 54 provides real-time optimal resource management within data processing system 10.

Referring again to FIG. 2, corresponding bit fields of control registers 42 and 52 are input into one of multiplexers 60–66. If performance monitor dynamic control of access to shared resource 22 is enabled, for example, by setting a control register, performance monitor 54 asserts a select signal 56 that selects the values of the fields of control register 52 as the outputs of multiplexers 60–66. Alternatively, if performance monitor dynamic control of access to shared resource 22 is not enabled, select signal 56 is not asserted, and multiplexers 60–66 select the values of the fields of control register 42 as outputs. As illustrated, the 16-bit outputs of multiplexers 60–66 are each individually ANDed with the 16-bit output of decoder 40 utilizing AND gates 70–76. The 16 bits output by each of AND gates 70–76 are then ORed utilizing one of OR gates 80–86 to produce four 1-bit signals that indicate which of requestors 12–18 was granted the highest priority during the current cycle. As depicted in FIG. 2, each of the 1-bit signals is then ANDed with a corresponding request signal utilizing one of AND gates 90–96. The output of each of AND gates 90–96 is then transmitted to the corresponding one of requesters 12–18 as a grant (1) or retry (0) signal.

As will be appreciated by those skilled in the art, the requester that is awarded highest priority in a given cycle may not generate (or have queued) a request for access to shared resource 22 during that cycle. Accordingly, resource controller 20 includes priority assignment logic 98, which assigns at least one subsidiary priority to one of requesters 12–18 in response to NOR gate 97 indicating that the assignment of the highest priority did not generate a grant signal. Priority assignment logic 98 can assign the subsidiary priority utilizing any one or a combination of methodologies. For example, priority assignment logic 98 may employ one or more of pseudo-random, fixed, round robin, fairness, or other priority assignment methodologies. Regardless of which method is utilized to determine the subsidiary priority, priority assignment logic 98 transmits a grant signal to the requester granted access to shared resource 22 in the current cycle.

Figure 4:
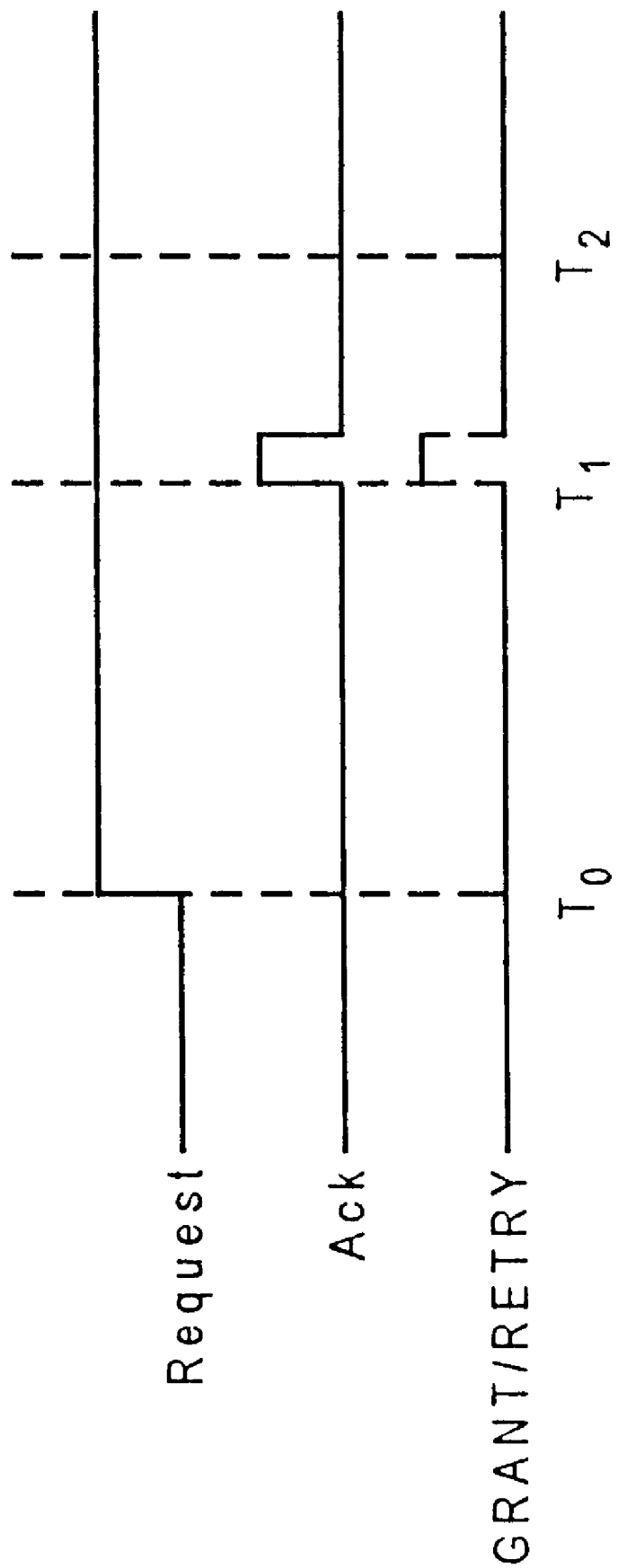
FIG. 4 is a timing diagram illustrating the relative timings of a request for access to the shared resource by a requester and a response to the request by the resource controller in the data processing system depicted in FIG. 1.

Referring now to FIG. 4, there is illustrated a timing diagram showing the timing relationship between generation of a request by one of requesters 12–18 and receipt of a grant signal from resource controller 20. As illustrated, one of requesters 12–18 asserts a request signal at time $T_0$. Subsequently, at time $T_1$, resource controller responds to the request by asserting an acknowledgement signal. In addition, if the request for access to shared resource 22 was granted, resource controller also asserts a grant signal at time $T_1$. If no grant signal is received by the requester at time $T_1$, the requester interprets the acknowledgement signal as a retry. Thereafter, at time $T_2$, the requestor can remove the request in response to the grant of access to shared resource 22 or in response to the request no longer being valid. Alternatively, in response to receipt of a retry signal, the requestor can continue to assert the request.

Requestors 12–18 can be implemented to support a number of behaviors in response to continue receipt of a retry signal. First, requesters 12–18 can be configured to retry a particular request for only a programmable (i.e, software specified) number of times. Alternatively, a requester can access selected bits of shift register 30 to ascertain a pseudo-random number of times to retry a request. For example, in an embodiment where a maximum of 31 retries are permitted, 5 bits of shift register 30 can be read by a requester in response to receipt of a first retry signal in order to determine a number of times to retry a particular request. As a second alternative, if optimal control of access to shared resource 22 is desired, performance monitor 54 can dynamically set the number of retries permitted for a particular request based, for example, upon the number of outstanding requests by other requesters.

Data processing system 10 can similarly implement a number of different methods of handling requests once the maximum number of retries for a request has been reached. For example, requesters 12–18 can remove a request for a programmable period of time once the maximum number of retries has been reached. Alternatively, a request can be removed for a pseudo-randomly selected period of time determined by accessing predetermined bits within shift register 30. For example, in an exemplary embodiment in which 5 bits within shift register 30 are utilized, a request can be removed for a number of clock cycles specified by the 5 bits. Again, if optimal control of access to shared resource 22 is desired, performance monitor 54 can alternatively be configured to dynamically set the number of cycles for which requesters 12–18 must remove requests that have been retried the maximum number of times.

With reference now to FIG. 5, there is depicted a second illustrative embodiment of a data processing system in accordance with the present invention. As illustrated, data processing system 200 includes requesters 212–218, which are each coupled to shared system bus 222 and which can each master (i.e., initiate bus transactions on) system bus 222. Requests for ownership of system bus 222 generated by requesters 212–218 are arbitrated by bus arbiter 220 in response to priority signals 230–236 generated by pseudo-random generator 224. Priority signals 230–236, which each correspond to a respective one of requesters 212–218, each contain pseudo-random duration pulses spaced by pseudo-randomly determined intervals. Importantly, at most one of priority signals 230–236 can be logic low at a time.

Referring now to FIG. 6, there is illustrated more detailed view of bus arbiter 220 of FIG. 5. As depicted, bus arbiter 220 includes transistors 250–256, which each correspond to one of requesters 212–218. Each of transistors 250–256 has a source connected to the request line of its associated requester, a gate connected to the corresponding one of priority signals 230–236, and a drain connected to the associated requester as a grant line. In operation, priority signals 230–236 are utilized to gate requests received from requesters 212–218 so that a requester making a request and having a logic low priority signal is granted ownership of system bus 222.

As has been described, the present invention provides an improved method and system for controlling access to a shared resource in a data processing system. The method and system of the present invention assign at least a highest priority to one of a plurality of requestors non-deterministically in order to avoid live locks and to prevent a single requester from monopolizing the shared resource. While providing all requesters an opportunity to obtain access to the shared resource, the present invention also permits requestors to be given diverse priority weights, under the control of either software or hardware, in order to ensure that high priority requesters have a greater probability of obtaining access to the shared resource.

While the invention has been particularly shown and described with reference to a preferred embodiment, it will be understood by those skilled in the art that various changes in form and detail may be made therein without departing from the spirit and scope of the invention.

What is claimed is:

1. A method of controlling access to a shared resource in a data processing system, said method comprising:

assigning each of a plurality of current priorities to a respective one of a plurality of requesters, at least a highest current priority among said plurality of current priorities being assigned substantially randomly with respect to previous priorities of said plurality of requestors, wherein assigning said highest current priority includes:
  generating a substantially random bit pattern including a plurality of bits each having a value of 1 or 0;
  allocating said highest current priority to one of said plurality of reguestors in response to values of fewer than all of said plurality of bits; and
in response to receipt of one or more requests for access to said shared resource from said plurality of requestors, granting a selected request among said one or more requests for access to said shared resource in response to said current priorities of said plurality of requestors.

2. The method of claim 1, and further comprising the step of sigrnaling a requestor among said plurality of requestors that generated said selected request that said selected request has been granted.

3. The method of claim 1, wherein said step of granting a selected request includes the step of rejecting a request, said method further comprising the step of signaling a particular requestor among said plurality of requestors that generated said rejected request that said rejected request was not granted.

4. The method of claim 3, wherein said signaling step comprises the step of transmitting a retry signal to said particular requestor.

5. The method of claim 4, and further comprising the step of:
  in response to receipt of said retry signal by said particular requester, again generating a request for said shared resource by said particular requester.

6. The method of claim 5, wherein said step of again generating a request for said shared resource is performed by said particular requestor only a substantially randomly selected number of times in response to continued receipt of retry signals.

7. The method of claim 6, and further comprising the step of thereafter removing said request for said shared resource by said particular requester for a substantially randomly selected period of time.

8. The method of claim 1, said assigning step being performed prior to each grant of access to said shared resource.

9. A method of controlling access to a shared resource in a data processing system, said method comprising:
  assigning each of a plurality of current priorities to a respective one of a plurality of requestors, at least a highest current priority among said plurality of current priorities being assigned substantially randomly with respect to previous priorities of said plurality of requestors, wherein said assigning step includes the step of generating a plurality of signals, each of said plurality of signals corresponding to a respective one of said plurality of requestors and each of said plurality of signals being in either an active or inactive state; and
  in response to receipt of one or more requests for access to said shared resource from said plurality of reguestors, granting a selected request among said one or more requests for access to said shared resource in response to said current priorities of said plurality of reguestors, wherein granting said selected request includes preventing access to said shared resource by each requestor having a corresponding signal that is in said active state.

10. The method of claim 9, wherein each signal among said plurality of signals is in said active state for a substantially randomly selected period of time and is in said inactive state for a substantially randomly selected period of time.

11. A system, comprising:
  a resource;
  a plurality of requestors that share said resource, each of said plurality of requestors including means for generating a request for access to said resource;
  means for assigning each of a plurality of current priorities to a respective one of said plurality of requestors, at least a highest priority among said plurality of current priorities being assigned substantially randomly with respect to previous priorities of said plurality of requesters, wherein said means for assigning includes:
    means for generating a substantially random bit pattern including a plurality of bits each having a value of 1 or 0;
    means for allocating said highest current priority to one of said plurality of requestors in response to values of fewer than all of said plurality of bits; and
  means, responsive to receipt of one or more requests for access to said shared resource from said plurality of requestors, for granting a selected request among said one or more requests for access to said shared resource in response to said current priorities of said plurality of requestors.

12. The system of claim 11, and further comprising means for signaling a requester among said plurality of requesters that generated said selected request that said selected request has been granted.

13. The system of claim 16, said means for granting a selected request comprising means for rejecting a request, wherein said means for signaling further comprises means for signaling a particular requestor among said plurality of requesters that generated said rejected request that said rejected request was not granted.

14. The system of claim 13, wherein said means for signaling a particular requestor among said plurality of requesters that generated said rejected request that said rejected request was not granted comprises means for transmitting a retry signal to said particular requestor.

15. The system of claim 14, each of said plurality of requesters further comprising:
  means, responsive to receipt of a retry signal, for again generating a request for said shared resource.

16. The system of claim 15, wherein said means for again generating a request for said shared resource comprises means for again generating a request for said shared resource only a substantially randomly selected number of times in response to continued receipt of retry signals.

17. The system of claim 11, wherein said means for assigning and said means for granting access together form a resource controller.

18. A system, comprising:
  a resource;
  a plurality of requestors that share said resource, each of said plurality of requestors including means for generating a request for access to said resource;
  means for assigning each of a plurality of current priorities to a respective one of said plurality of requestors, at least a highest priority among said plurality of current priorities being assigned substantially randomly with respect to previous priorities of said plurality of requestors, wherein said means for assigning includes a signal generator that generates a plurality of signals, each of said plurality of signals corresponding to a respective one of said plurality of requesters and being in either an active state or an inactive state; and
  means, responsive to receipt of one or more requests for access to said shared resource from said plurality of requestors, for granting a selected request among said one or more requests for access to said shared resource in response to said current priorities of said plurality of requestors, wherein said means for granting includes means for preventing access to said resource by each requestor having a corresponding signal that is in said active state.

19. The system of claim 18, wherein said means for assigning and said means for granting together form a bus arbiter and said resource is a shared bus.

20. The system of claim 18, wherein each signal among said plurality of signals is in said active state for a substantially randomly selected period of time and is said inactive state for a substantially randomly selected period of time.

21. The system of claim 11, wherein a number of said plurality of requesters is greater than a number of requests that can be granted concurrently.

* * * * *

UNITED STATES PATENT AND TRADEMARK OFFICE
CERTIFICATE OF CORRECTION

PATENT NO. : 5,935,234
DATED : August 10, 1999
INVENTOR(S) : Arimilli et al.

It is certified that error appears in the above-identified patent and that said Letters Patent is hereby corrected as shown below:

Column 5, Line 38 delete "To" and replace with --$T_o$--.

Signed and Sealed this

Twenty-third Day of May, 2000

Attest:

Q. TODD DICKINSON

*Attesting Officer*          *Director of Patents and Trademarks*